Nov. 6, 1956

J. JARVIS 2,769,955

THERMAL TIME DELAY CIRCUIT

Filed Dec. 4, 1952

2 Sheets-Sheet 1

INVENTOR.
JOHN JARVIS
BY
Oscar B Brumback
ATTORNEY

Nov. 6, 1956 J. JARVIS 2,769,955

THERMAL TIME DELAY CIRCUIT

Filed Dec. 4, 1952 2 Sheets-Sheet 2

INVENTOR.
JOHN JARVIS
BY
Oscar B Brumback
ATTORNEY 2,769,955

Patented Nov. 6, 1956

2,769,955

THERMAL TIME DELAY CIRCUIT

John Jarvis, Dumont, N. J., assignor to Bendix Aviation Corporation, Teterboro, N. J., a corporation of Delaware Application December 4, 1952, Serial No. 324,000

6 Claims. (Cl. 323—69)

This invention relates generally to electrical systems and more particularly to electrical control systems utilizing time delay devices.

The present invention is an improvement over the thermal time delay tube described in U. S. Patent No. 2,463,805, issued March 8, 1949, to W. R. Polye and over the control circuit described in copending application Serial No. 90,236, filed April 28, 1949, by A. Bennett et al. Both the patent and the copending application are assigned to the assignee of the present invention.

The circuit of copending application Serial No. 90,326 comprises: (1) an input for receiving a command signal, (2) a discriminator for discriminating the phase of the signal, (3) an amplifier interconnecting the input and discriminator for amplifying the input signal, (4) a thermal time delay tube of the type described in the above named patent associated with the discriminator for developing a control signal of a given phase and amplitude as a linear function of the input, and (5) a feed back connection between the thermal time delay tube and the signal input for feeding the control signal back to oppose and cancel out the input signal. The present invention eliminates certain elements of the above combination and improves the action of circuit in regards to quadrature components.

Control systems are usually designed to respond to signals that bear a predetermined phase relationship with respect to a main operating voltage input. The signals actually obtained, however, frequently do not have the desired phase relationship because, for example, as a result of manufacturing tolerances the signal generator may shift the phase of the signal or couplings in the circuit, such as transformers, may shift the phase of the signal.

The signal of shifted phase may be considered as having two components: (1) a component that has an in-phase or 180 electrical degrees out of phase relationship with respect to the phase of a main operating voltage; and (2) another component, termed a quadrature, that has a phase shifted ninety degrees with respect to the phase of the main operating voltage. These quadrature voltages are due entirely to random characteristics of the circuit; they may be large or small and positive or negative ninety degrees with respect to the in-phase component.

While the circuit of the above noted copending application worked well in practice, the disadvantage was presented that the system affected only the in-phase signal component and not the quadrature component. Unless the quadrature component is affected, the controlled element may not respond accurately. For example, after a command signal to a circuit such as in the above noted copending application has been constant long enough for transients to die out, the feed back signal developed in the circuit to oppose and cancel the command signal becomes equal in amplitude and opposite in phase to the in-phase component of the command signal and cancels it out. While the controlled element will receive no signal from the in-phase component, the possibility is fairly good that it may receive a large quadrature signal which has not been cancelled and which is entirely of a random nature and not at all representative of the command signal.

An object of this invention, therefore, is to provide a novel control circuit that is responsive to a command signal regardless of its phase with respect to main operating voltages.

Another object of this invention is to provide a novel electrical circuit which may be used as a high pass filter, a low pass filter, or a rate of change sensor.

A further object is to provide a novel electrical circuit which will affect not only the in-phase component but also the quadrature component.

Still another object is to provide a novel control tube for electrical circuits.

The above and further objects and novel features of the invention will appear more fully hereinafter from a consideration of the detailed description which follows, taken together with the accompanying drawings wherein an embodiment of the invention is illustrated. It is to be understood, however, that the drawings are for the purposes of illustration and description only, and are not to be construed as defining the limits of the invention.

In the drawings, wherein like reference numbers refer to like parts:

Figure 1:
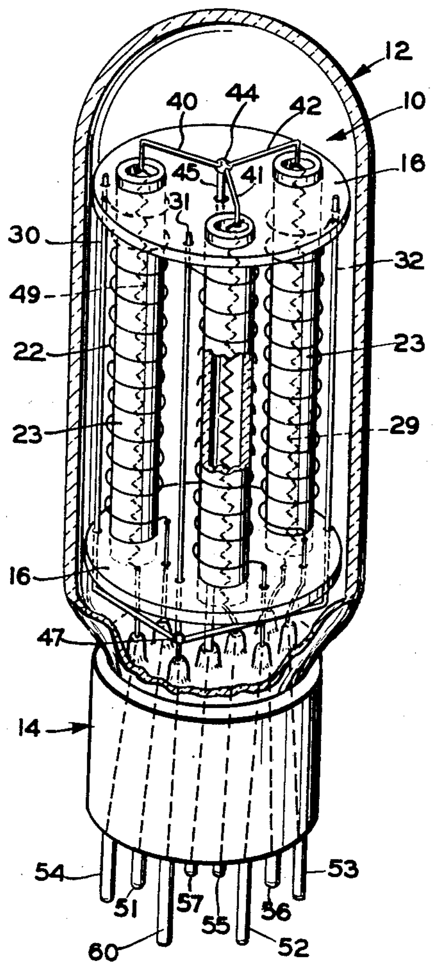
Figure 1 illustrates schematically the novel control tube of the present invention.

Referring now to the drawings, Figure 1 illustrates schematically the novel control tube. While the novel tube is generally of the type described in U. S. Patent No. 2,463,805, it differs in that it operates with a polyphase power source. In essence, the tube is comprised of a framework or cage generally designated as 10, a shell 12 enclosing the cage, and a base 14 closing the shell.

To form the framework 10, a plurality of discs 16 of electrically insulating material, such as mica, are spaced apart by conductors. These discs mount supporting elements 23, and the conductors lead the current from the electrical elements positioned without and within the supporting elements.

Supporting elements 23 are hollow cylinders of electrically insulating material such as ceramic, glass, etc. Electric current passing through the high resistance heating wires 22 that are spirally wrapped about the outside surface of cylinders 23, heat the cylinders. The cylinders, in turn, heat by radiation the resistors 29 within the cylinders.

The embodiment illustrated herein has three cylinders. The heating wires for the cylinders are connected to conductors 30, 31 and 32 which connect to a common junction 47. In a similar manner, leads 40, 41 and 42 connect the resistors to a common junction 44 which is one end of a conductor 45.

Shell 12 enclosing cage 10 is joined to the base 14 in any suitable manner and then evacuated. This evacuation gives added life to the tube and aids in the control of its time delay period. The prongs which hold the tube in a socket and provide the electric contacts are also a part of base 14.

In the tube of the present embodiment, prongs 51, 52 and 53 are each connected to a respective heater wire. Similarly, prongs 54, 55 and 56 are each connected to a respective resistor. A prong 57, connected through conductor 45 to the common junction 44 of the resistors, defines the output; a prong 60, connected to the common junction 47 of the heater wires, defines the input.

Suitable polyphase alternating current power sources supply excitation energy to the heater wires and to the resistors. These power sources must have a fixed phase relationship relative to each other. In practice, the power sources are usually derived from the same generator, although they need not come through the same transformers or couplings.

Figure 8:
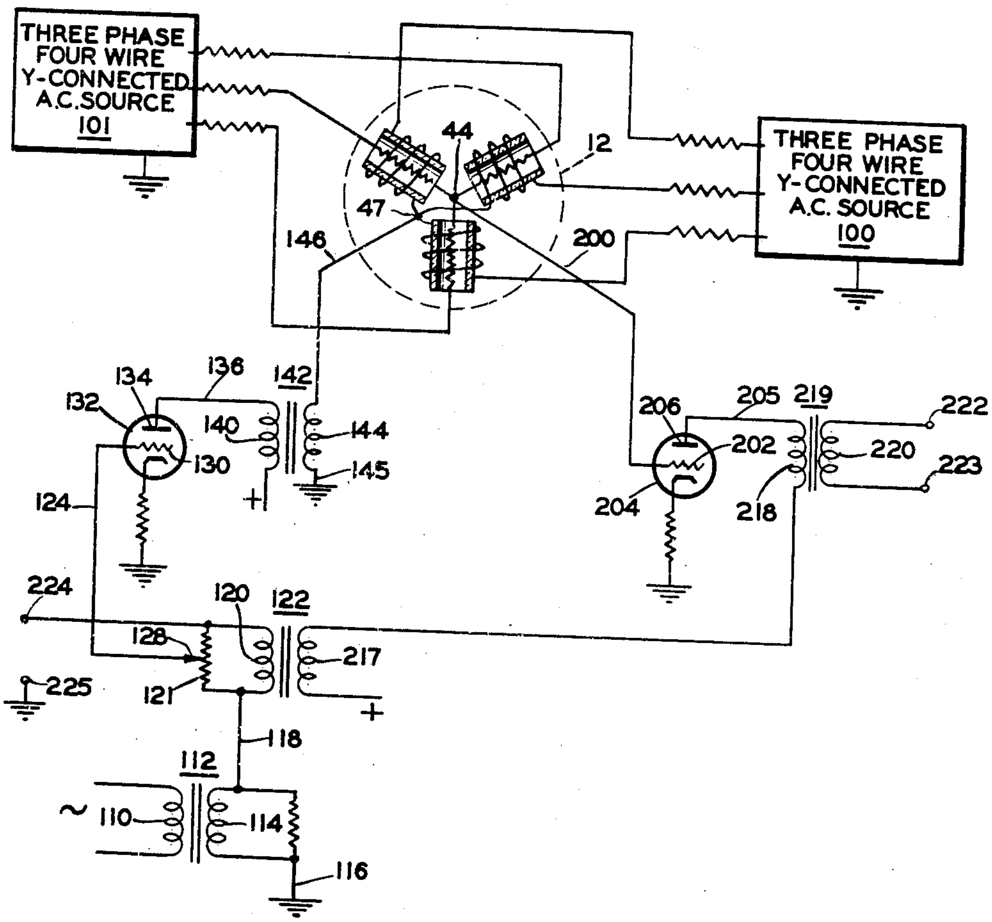
Figure 8 illustrates schematically a novel wiring diagram utilizing the novel control tube of Figure 1 for control purposes.

In the illustrated embodiment, referring to Figure 8, the excitation source 100 for the heater wires is a three-phase, four wire, Y-connected alternating current source having the neutral wire grounded. The power source is connected to prongs 51, 52 and 53 so that each phase of the power source excites only one heater wire. Another three-phase, four wire, Y-connected power source 101 with a grounded neutral wire is similarly connected to the resistors by prongs 54, 55 and 56 so that each phase excites only one resistor. The command signal is applied to prong 60 and the resultant signal is taken from prong 57.

The operation of the heater and the resistor in heat exchange relationship with it is readily apparent from the cross sectional showing in Figure 1. The heater wire 22, heated by the current flow, heats the hollow cylinder 23. The hollow cylinder 23, in turn, heats by radiation the resistor 29 within it. The temperature change of the resistor changes its resistance value, thereby influencing the passage of electricity through it.

The interval of time that lapses between the application of energy to the heater wire and the corresponding change in the resistance value of the resistor can be predetermined to any desired extent. For example, the time required for a heater wire to reach its maximum steady state temperature depends upon the mass and material of the wire, the mass and material of the hollow cylinder, and the pressure and nature of the gas in the tube. The steady state temperature of the resistor and the time required to reach its depends upon similar variables and as is similarly predeterminable.

The operation of the novel tube is easily explained by the aid of vectors; a commonly used manner of illustrating alternating current systems since alternating currents have magnitudes and directions when compared with each other.

Figure 2:
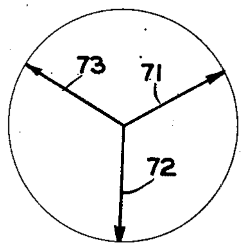
Figure 2 illustrates vectorially the relationship of the alternating current supply of the heater circuit of the novel control tube of Figure 1.

Figure 2 illustrates vectorially the relationship of the potential in the three heater wires of the novel control tube shown on Figure 1 when no command signal is applied to the tube. Since this is a three-phase system, the vectors 71, 72 and 73 are 120° apart in direction and are equal in magnitude so the resultant, as determined from the neural wire, is zero. A sufficient amount of current flows in the heating wires, nevertheless, to heat these wires to the mid-point of their usable temperature range.

Figure 3:
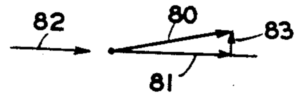
Figure 3 illustrates vectorially how a command signal may be resolved into in-phase signal component and quadrature component signal.
Figure 4:
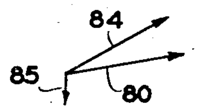
Figure 4 illustrates vectorially the command signal of Figure 3 resolved into two components in the directions of two adjacent components of the heater of Figure 2.
Figure 5:
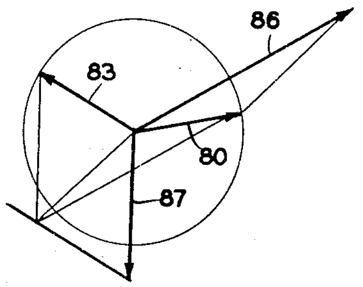
Figure 5 illustrates vectorially the effect of the addition of the command signal of Figure 3 to the heater circuit of Figure 2.

Referring now to Figure 3, a typical command signal 80 is shown resolved into two vectors, a vector 81 in-phase with a main operating potential 82 of the system and a quadrature component 83 that is of a phase displaced 90° with respect to the main operating potential. In Figure 4, command signal 80 is resolved into two other components 84 and 85 that have a phase relationship similar to the two adjacent components 71 and 72 in Figure 2.

As command signal 80 is added to prong 60 and so to the common junction 47 representing the neutral wire, vector 84 adds to vector 71 to give a new vector 86. Similarly, vector 85 adds to vector 72 to give a new vector 87. Vector 83 remains the same as in Figure 2. This vector addition raises the temperature of the heater wire in which vector 86 appears and of the wire in which vector 87 appears; the wire in which vector 83 appears remains unchanged.

Figure 6:
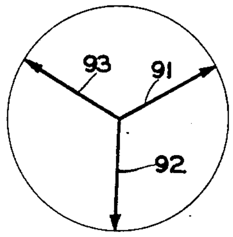
Figure 6 illustrates vectorially the relationship of the alternating current supply in a resistor circuit of the novel tube of Figure 1.
Figure 7:
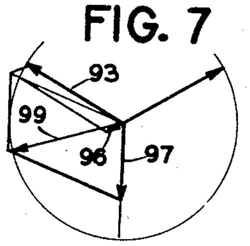
Figure 7 illustrates vectorially the effect of the heat generated by the signal of Figure 5 to the heater circuit on the current flow in the resistors of the novel control tube of Figure 1.

Figure 6 illustrates the vector relationship of the excitation energy in the resistors within the heater tubes with no command signal applied to the tube. Normally these vectors are balanced so no current flows in the neutral wire through common junction 44 and conductor 45 to prong 59. Since these resistors are in heat exchange relationship with the heating wires, however, they are heated correspondingly when a command signal appears at the heater input. The change in temperature of the heaters and the consequent change in temperature of the resistors changes the resistance value of the resistors, unbalancing the circuit as in Figure 7.

The resistor in which current flow represented by vector 91 had received the greatest amount of heat has its resistance increased the most. The current now flowing through the resistor can be represented by vector 96. The resistor through which current vector 92 passes has not been heating quite so much, the changed current flow being represented by vector 97. Vector 93 has not been affected. The resultant of these vectors is vector 99 which would appear at prong 57 and represents the current flow through the fourth wire.

Since the command signal is resolved into two components, and since the three components of the heater and resistor elements cover the entire three hundred sixty degrees of direction into which the vector may be resolved, then the control tube will respond to any command signal regardless of its phase relationship.

The magnitude of vector 99 corresponds to the magnitude of the input signal vector 80, while the direction of the vector depends upon the phase relationship of the excitation source for the heater wires and the resistors. Since the excitation source for these elements need not be of the same magnitude, the tube may be used as an amplifier. Thus, the excitation source for the resistors may be of much greater magnitude than the excitation source for the heaters, in which event the resultant vector 99 will correspond to an amplification factor for signal 80.

Figure 8 illustrates the novel control tube in a control circuit which may provide a low pass filtering action, a high pass filtering action, a rate of change of input signal strength and/or an averaged integral of the input to the system.

In the embodiment of the novel circuit illustrated, a suitable command or input signal from the controlling element is impressed across the primary 110 of an input transformer 112, inducing a signal on the secondary winding 114 which is grounded at one end by a lead 116. A lead 118 conducts the signal from the other end of secondary winding 114 to the secondary winding 120 of a feed back transformer 122, whereupon the signal is also impressed upon the resistor 121 connected across winding 120. A lead 124 conducts the signal from adjustable tap 128 of resistor 124 to the grid 130 of an amplifying tube 132. From plate 134 of amplifier 132, lead 136 conducts the amplified signal to the primary winding 140 of a coupling transformer 142, inducing a signal on secondary winding 144 whose one end 145 is grounded. From the other end of secondary winding 144, a lead 146 conducts the signal through prong 60 to the common heater junction 47 of the novel control tube. The signal affects the heater elements and the resistors in the manner discussed above.

A lead 200, defining the output of the resistive network, conducts the signal from the common resistor junction 44 of the novel control tube to the grid 202 of an amplifier 204. A lead 205 conducts the amplified signal from plate 206 of amplifier 204 to the primary winding 217 of transformer 122.

A winding 218 of a transformer 219 in lead 205 induces a signal on a secondary winding 220 to give a low pass filtering action. Terminal 224 of winding 120 relative to grounded terminal 225 gives a signal indicative of a high pass filter.

In the operation of the novel circuit, a signal from the command source appears at a primary winding 110. Lead 118 conducts the signal induced on winding 114 to winding 120 of transformer 122. The signal is taken from resistor 121 by a tap 128, amplified in amplifier 132, and coupled by transformer 142 to a lead 146 where it is conducted to the common junction 47 of the novel control tube.

In the novel control tube the signal is resolved into components as explained before, changing the heating relationship of the heaters. The changed heating relationship, changing the resistance value of the resistors in heat exchange relationship with the heaters, unbalances the resistive network to create a signal in lead 200. The signal is impressed upon grid 202 of amplifier 204 and from plate 206 is conducted through primary winding 218 of transformer 219 to the primary winding 217 of transformer 122 in opposition to the input signal.

The circuit may be used as either a high pass or low pass filter or as both. The frequencies that are to be passed determine the selection of the time constants of the time delay tube.

The novel circuit will separate the high and low modulation frequencies of a suppressed carrier modulated input signal in this manner:

An illustrative command signal consisting of two superimposed components, one component having a modulation frequency of sixty cycles per second and the other component a modulation frequency of one-half cycle per second, is applied to the input 110 of the thermal time delay tube of the novel circuit of Figure 8. In this illustration, the time delay tube has a one-thirtieth of a second time constant. The higher frequency signal component of the input signal will appear between terminal 224 and grounded terminal 225 unchanged. The higher frequency component will not appear at the output lead 200 because the thermal inertia of the time delay tube is too great to pass the high frequency component of sixty cycles per second to the output 200.

The time delay tube will, however, respond to the lower frequency signal component of one-half cycle per second. The low frequency signal component will appear at output lead 200 and be conducted by lead 205 to the primary winding 217 of feed back transformer 122. As the lower frequency component of the input signal apears in secondary winding 120 of transformer 122, it is continuously cancelled out by the feed back signal from output lead 200 in the primary winding 217. As a result, no appreciable part of the lower frequency signal component appears at terminal 224. The signal obtained from terminals 222 and 223 of the secondary winding 220 of transformer 219, then, is the low frequency signal while the high frequency signal is obtained from terminal 224. Tap 128 of resistor 121 provides continuous signal to amplifier 132 even though the signal in winding 120 may be completely opposed by the feed back signal.

The signal across winding 120 is a signal indicative of the rate of change in command signal strength. A command signal at winding 120 is passed through the heaters of the novel time delay tube. After a predetermined interval of time, the novel tube develops a signal at output 200 which is fed back on winding 217 in phase opposition to the command signal. The difference in amplitude between the signal now appearing at the input and the feed back signal (representing the former signal) is the rate of change in signal strength during the interval of time delay of the tube.

The novel tube will respond to an input signal of any phase. Any vector quantity of such as the input signal may be resolved into two vector components which have an angle between them of less than one hundred eighty degrees. The three phases of the heater circuits cover the entire three hundred sixty degrees of direction possible, yet the angle between any two adjacent heaters is one hundred twenty degrees. Therefore, the tube will respond to a command signal regardless of its phase relationship, since a signal of any phase can be resolved into components having an angle between them of one hundred twenty degrees. It is only necessary then, to take a constant signal of a given phase at input 110 and set the constants of the circuit so that the signal is "washed out" at transformer 122. Thereafter, a constant value signal of any phase which appears at the input will also be "washed out".

The foregoing has presented a novel thermal delay device in the nature of a vacuum tube which, after a desired predetermined interval of time, will develop a control signal in response to a command signal. The novel control tube, further, is responsive to the command signal regardless of its phase relationship with respect to any main operating input of the system. Also, the novel circuit provides a low pass filtering action, a high pass filtering action, and a signal that is indicative of a rate of change of command signal strength, yet which effects a material saving in weight and space over conventional circuits utilizing conventional elements for these purposes.

Although only one embodiment of the invention has been illustrated and described in detail, it is to be expressly understood that the invention is not limited thereto. Various changes and modifications can be made in the design and relative arrangement of parts without departing from the scope of the invention as will now be understood by those skilled in the art. For a definition of the invention, reference will be had primarily to the appended claims.

I claim:

1. An electrical control device comprising a heating system including a normally balanced three-phase, four-wire resistive network, a three-phase power source for said network, a source of control energy for said fourth wire, whereby control energy supplied to said fourth wire unbalances said resistive network resulting in a heating of selected resistances, a system in heat exchange relationship with said heating system including a second normally balanced three-phase, four-wire resistive network, and a three-phase power source for said network, the fourth wire defining the output of said latter system whereby a heating of the first system in response to control energy supplied to said first-named fourth wire results in a heating of the last-mentioned system and its consequent unbalance so that the last-named fourth wire defines the output of the system.

2. A control tube comprising a polyphase energized normally electrically balanced heater network including at least three heater elements responsive to electrical excitation by heating and connected to a common junction, means for supplying alternating current control excitation to said common heater junction to differentially heat said heaters, a second network including at least three thermally responsive polyphase excited normally balanced resistor means placed in heat exchange relationship with said heater elements and also connected to a common junction, means for obtaining alternating current electrical energy from said common resistor junction upon unbalance of said resistive network by the differential change in said heaters, and means for surrounding said networks with a low pressure atmosphere.

3. A circuit for receiving alternating current command signals comprising at least two heaters individually heated to a predetermined temperature level by alternating current excitations, the phases of said excitations being less than 180 electrical degrees apart, an input for said signal connected to said heaters, said signal changing the temperature of said heaters as a function of the phase of the signal with respect to the phase of the alternating current excitation of each heater whereby said signal is resolved into heat effects corresponding to components of the signal with respect to selected phases, normally balanced means energized and thermally associated with said heaters and heated thereby, said last named means being unbalanced by said differential heating and thereby summing said components to provide a corresponding signal, and means for feeding said last named signal to said input signal in opposition thereto.

4. A network for receiving an alternating current command signal comprising means energized by alternating currents of selected phases for resolving said command signal into differential heat effects corresponding to components of said signal with respect to said selected phases, said phases being less than 180 electrical degrees apart, means associated with said resolving means and heated thereby after a predetermined interval of time, said last named means being normally balanced but being unbalanced by said heating to develop a control signal corresponding to the sum of said components, and means for predetermining the interval of time between the application of the command signal to said resolving means and the appearance of a control signal from said summing means.

5. An electrical apparatus comprising an input network for receiving an alternating current command signal and an output network for supplying a control signal, said input network including a normally balanced polyphase excited resistive network having at least three legs responsive to said command signal by differential heating, the heating of each leg being a function of the phase of its excitation with respect to the phase of the command signal, said input and output networks being thermally connected, said output network including a second normally balanced polyphase resistive network which is unbalanced upon change in temperature of the legs of said first network to develop a control signal corresponding to the unbalance of the first network.

6. An electrical control device comprising a plurality of heaters having a common junction, a plurality of resistors responsive to thermal changes by changes in resistance and having a common junction, means for arranging said resistors and heaters so that each resistor is in heat exchange relationship with a respective heater, a polyphase excitation source for said heaters, means for connecting said excitation source with said heaters so that each heater has an excitation of a phase different from that of the other heaters, two of said phases being less than 180 electrical degrees apart, a polyphase excitation source for said resistors, means connecting said last named source and said resistors so that each resistor has an excitation of a phase different from that of the other resistors and so that said resistors form a normally balanced network which develops no net output at said common resistor junction as long as said network is balanced, means for impressing an input signal of a prescribed phase on said common heater junction, said input signal adding to or bucking out the excitation of each heater as the phase of the signal has a component in phase with or in phase opposition to the phase of the excitation of the respective heaters from said first mentioned source, whereby each heater is heated as a function of the phase of the signal and the phase of the excitation and whereby said resistors, being in heat exchange relationship with said heaters, are differentially heated thereby changing resistance and unbalancing said network, and means for obtaining from said common resistor junction the net output caused by the unbalance of said network.

References Cited in the file of this patent

UNITED STATES PATENTS 2,432,036 Noxon ------------------- Dec. 2, 1947